United States Patent [19]
Igram

[11] Patent Number: 5,004,189
[45] Date of Patent: Apr. 2, 1991

[54] RECONFIGURABLE AIRFOIL

[76] Inventor: Dale J. Igram, 4308 Brookside Dr., Kokomo, Ind. 46902

[21] Appl. No.: 400,782

[22] Filed: Aug. 30, 1989

Related U.S. Application Data

[63] Continuation-in-part of Ser. No. 238,473, Aug. 31, 1988, abandoned.

[51] Int. Cl.⁵ ............................................. B64C 3/44
[52] U.S. Cl. .................................................. 244/219
[58] Field of Search ........................................ 244/219

[56]         References Cited
U.S. PATENT DOCUMENTS

| 1,791,146 | 2/1931 | Rocheville | 244/219 |
| 1,848,368 | 3/1932 | McMaster | 244/219 |
| 2,223,335 | 11/1940 | Stewart | 244/219 |
| 2,288,750 | 7/1942 | Seeman | 244/219 |
| 2,349,858 | 5/1944 | Gillmor | 244/219 |
| 4,706,913 | 11/1987 | Cole | 244/219 |

FOREIGN PATENT DOCUMENTS 209031 12/1924 United Kingdom ............... 244/219

Primary Examiner—Galen Barefoot
Attorney, Agent, or Firm—Robert A. Spray

[57]        ABSTRACT

An airfoil having a device for changing the spacing between the airfoil's surface panels, thus to change the aerodynamic property of the airfoil. Considering the airfoil as in the case of the airfoil being a part of an airplane wing, the airfoil carries a flap panel along the wing's front edge, the flap panel being movably interconnected to the airfoil's lower panel, and is slidable along the airfoil's upper panel as the panel-spacing is changed, providing an effectively air-sealed relationship of the panels; and that controlled adjustability is provided by a control shaft which, by gearing of both upper panel's movable support means and of the flap panel support means, thus achieving their co-ordinated movement to change the airfoil shape.

8 Claims, 2 Drawing Sheets

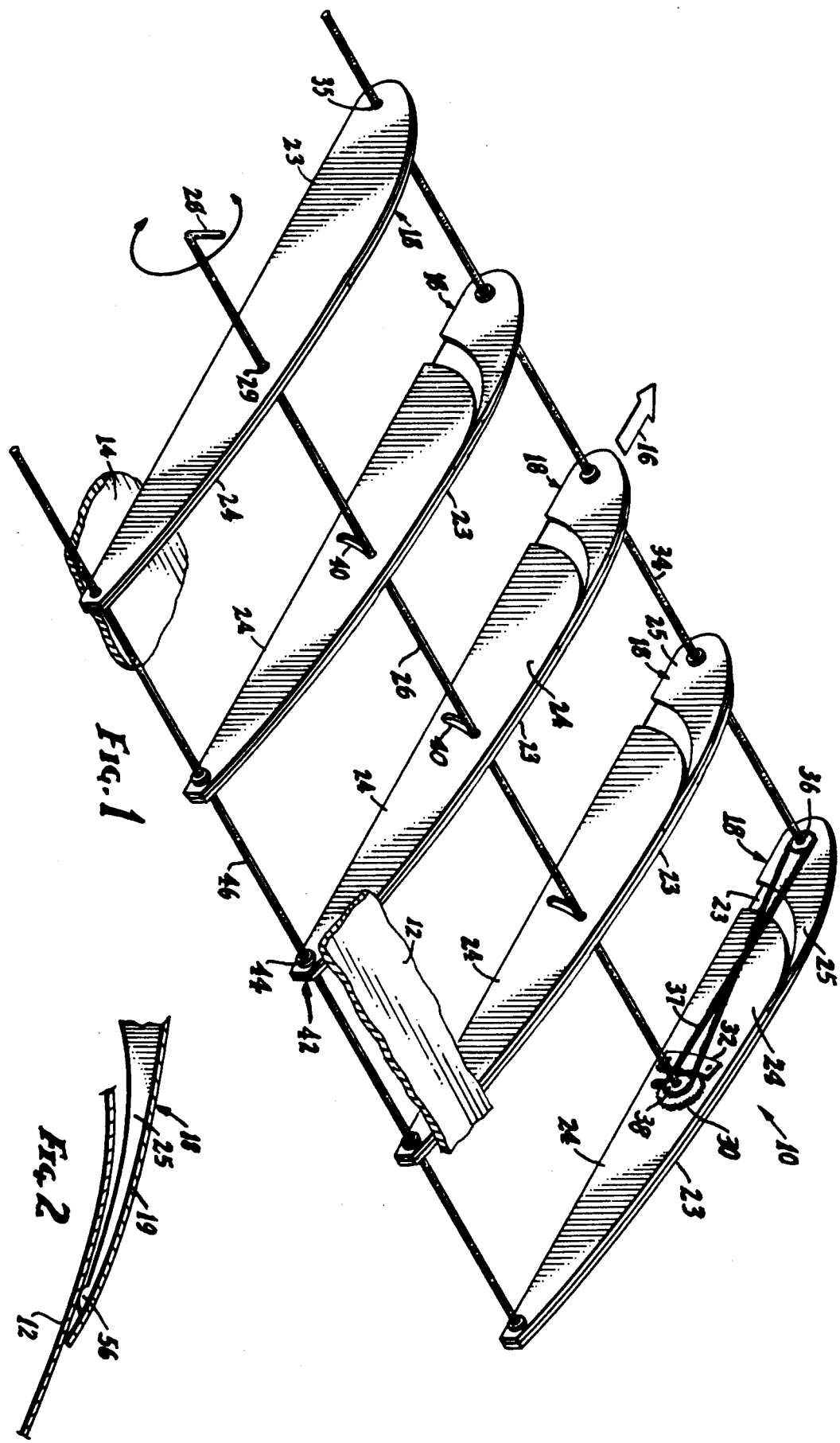

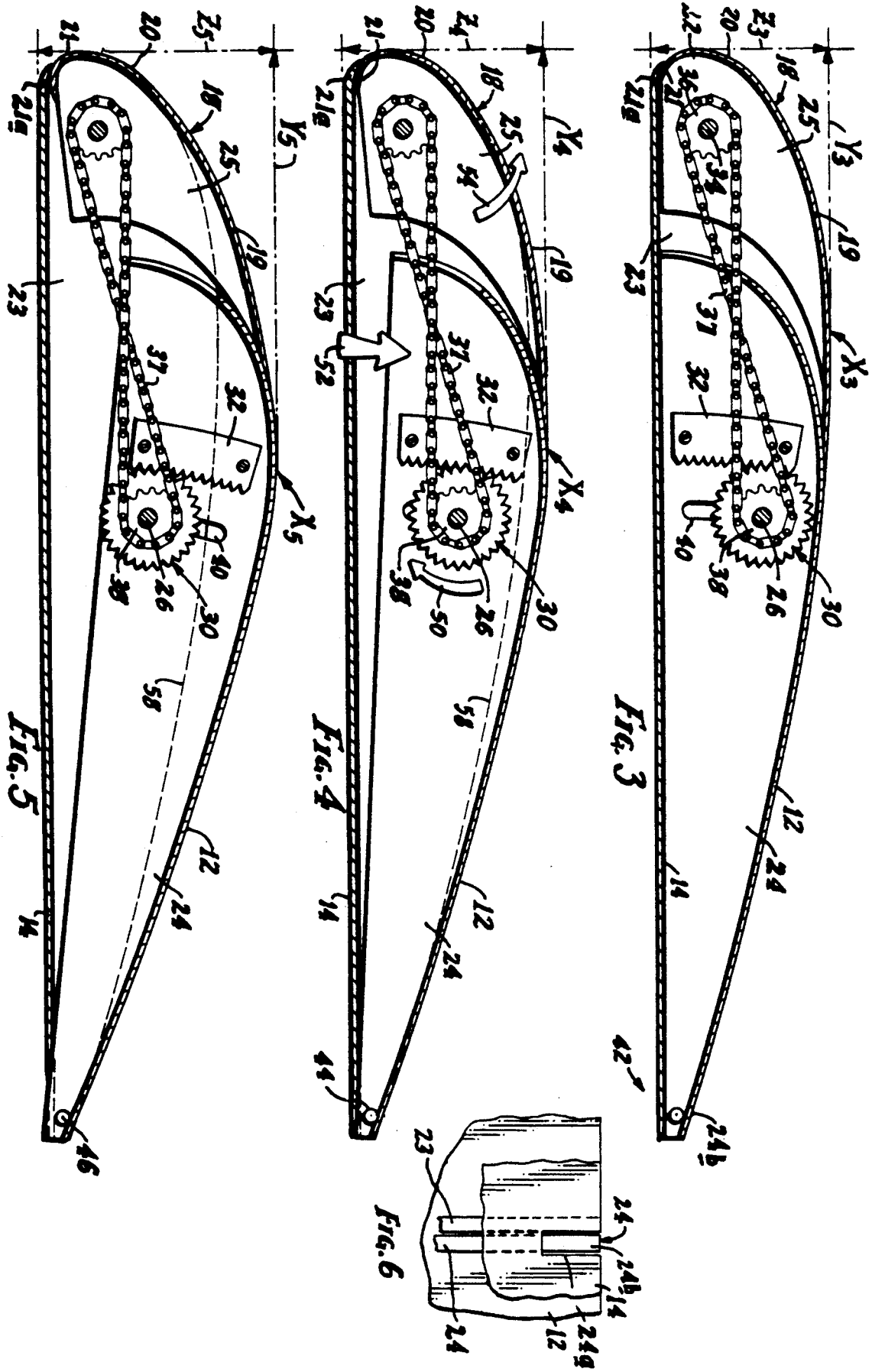

RECONFIGURABLE AIRFOIL

I. RELATION TO OTHER CASE

The present invention as a continuation-in-part of pending U.S. patent application Ser. No. 07/238,473, filed by the same inventor on Aug. 31, 1988, entitled "Airfoil" now abandoned.

II. FIELD OF THE INVENTION

The present invention relates to any application involving the use of an airfoil, such as aircraft wings, helicopter blades, etc.; and more particularly, the invention relates to the provision of novel concepts for the changing of the aerodynamic characteristics of the airfoil.

(The airfoil embodying the inventive concepts is here illustratively set forth as in the case of the airfoil being an aircraft wing; but the application of these concepts to other airfoils should be apparent.)

It has long been known, according to the inventor's understanding, that the aerodynamic characteristics or "lift effect" of an airfoil, such as illustratively considered as an airplane wing, is a physical pneumatic effect of the relative passage, through the surrounding air, of a wing member having an overall shape such that the differential in relative wind velocities as to upper and lower wing surfaces produces an upward force or "lift".

Further, according to the inventor's understanding, much scientific study, experimentation, wind tunnel studies, etc., have been done for many years, attempting to maximize the lift-effect of wings, by a consideration of various factors of the overall shape of the airfoil section, and the factors of shape, angle of presentation, etc., of airfoil sections.

More particularly, according to this inventor's understanding and awareness, there are used today basically three types or methods of control of the amount of lift associated with an airfoil, as now specified, although none provide a changeability of the spacing of the outer airfoil panels.

The first and probably the most commonly used method is an airfoil that has a movable trail-edge flap which is hinged on the trailing edge of the airfoil. By mechanical means, the flap changes angular position, either in an upward or downward motion; and, because the flap is provided to change positions, lift produced by the airfoil is either increased or decreased. This particular airfoil changeability as to the airfoil's camber is common as to small airplanes.

Another method used for controlling lift, i.e., increasing or decreasing lift, is by sliding a flap outwardly or inwardly, respectively, at the front of the airfoil's leading edge, as a changeable extension of and from the airfoil's leading edge. The flap is mechanically operated; and, as does the first method, it controls lift by changing the airfoil's camber characteristics.

A third method for controlling lift is the provision of a hinged flap located about mid-way of the top section of the airfoil. This method is primarily used for inducing drag.

Present-day large jetplanes use all three methods for controlling lift and drag; and although all methods change aerodynamic characteristics of the overall airfoil, all these methods provide changeability by methods different from changeability of the relative spacing of the upper and lower outer panels of the airfoil.

More particularly as to the frontal air-flap concept for controlling airfoil shape, several references were cited by the Examiner in this invention's parent application cited above; and this is to specify them and summarize how they miss the present concepts of control:

British Pat. No. 209,031 consists of several moving surfaces for creating a variable wing-surface camber; and contains several spring links and several internal moving levers to create such a variable camber effect. Significantly, however the invention is inherently mechanically complex; and due to the multiple moving surfaces, it likely would not have good aerodynamic characteristics.

McMaster, U.S. Pat. No. 1,848,368, has a simpler internal structure as compared with British Pat. No. 209,031. However, the McMaster concept seems to consist of only part of a wing; and at a high camber configuration would likely not create very smooth airflow near the trailing edge of the wing. The skin of the airfoil is made up of overlapping flexible steel, and the overlapping layers are held together by movable bolts and nuts. However, due to the limited flexibility of steel or any other reasonably thick metal, the amount of change in the camber seems to be unduly limited; and over a period of time, due to the flexibility, the overlapping layers would be quite subject to fatigue and deterioration. Also, there are several internal moving mechanisms for creating a change in the airfoil camber, and thus there would be problems of weight, too many moving parts, and limitation to variable airfoil designs.

Rocheville, U.S. Pat. No. 1,791,146, has several working mechanisms, which are the eccentrics, a control rod connected to the eccentrics, movable frame structure, and wire tension lines, making for a simpler design as compared to the two mentioned above. The Rocheville wing uses a flexible steel layer for the skin, and as the movable internal frame advances up, the steel layer is flexed, thus creating an increase in the airfoil camber. However, the amount of change in the airfoil camber is limited due to the flexibility limitations of the steel layer. As the front section of the airfoil increases in thickness, the trailing edge is forced downward. As a result, as lift increases so does drag, which directly decreases air speed. Overall, this design seems to have relatively good aerodynamics.

Stewart, U.S. Pat. No. 2,223,335, is mechanically complex due to the design and use of double arm cranks, push rods, flanges, drag links, liquid reservoirs and associated hydraulic actuators, double action expansion cylinders, etc. Because of the exposed hinges on the leading and trailing edges of the wing, aerodynamic characteristics seem likely to be poor. And since an enormous amount of parts (stationary and movable) are required, weight would be a problem even though the Stewart wing seems to have a sound internal structure.

Seeman, U.S. Pat. No. 2,288,750; the wing or airfoil consists of three skin sections, where the leading edge skin section overlaps the midskin section which overlaps the trailing edge skin section. The skins are made of flexible metal; thus the amount of change to the camber is limited by the flexibility limitation of the metal skins. The aerodynamic characteristics seem to likely be relatively good. However, this design too has a relatively complex arrangement of rock levers, ball and socket joints, flanges, springs, bell crank levers, etc.

The last patent of the cited patents, Gillmor, U.S. Pat. No. 2,349,858, seems to have a good sound internal structure, good aerodynamic characteristics, and a relatively simple design. The internal mechanisms for varying the wing's camber consist of pinions, gears, drive shafts, and an electric motor. The leading edge steel plate has rollers to reduce skin friction between it and the skin surface of the upper section of the wing. However, there seem to be no means of keeping the leading edge steel plate in place during flight. Also, because of the rib configuration there would be a limitation on how thin the wings could be made.

In conclusion, the six patents mentioned above do not have all of the concepts of the present invention, particularly as to their lack of the two gear and chain assemblies for creating the variation in the airfoil camber, and its lack of requirement of complicated internal mechanisms or flexible steel skins; and thus the reference patents do not provide the present invention's advantages with respect to the following significant factors:

1. Simple internal design;
2. Simple and sound internal structure;
3. Very few parts (moving and stationary);
4. Good aerodynamic characteristics; and
5. Lighter in weight.

The above is believed to be generally accurate as a very brief summary; and although the inventor is not asserting it as of scientific precision as to the knowledge of airfoil characteristics or as to the history of the long consideration of airfoil design and its factors, it shows the field and general background of the present invention.

III. SUMMARY OF THE INVENTION:

The present invention builds upon the prior art knowledge of the airfoil characteristics of an airfoil as depending on the overall shape of the airfoil section, and provides novel concepts as to the achievement of the airfoil's shape-change.

More particularly, the present invention provides a gear and chain link system, with a single control shaft or rod to control the position and movement of the leading edge flap support means, here shown as ribs, as well as to control the position and shape of the upper sheet of the main section of the airfoil.

A series of rib-like support means pairs, one rotatable and one stationary, control respectively the upper and lower sheets of the airfoil.

The gear and chain link system consists of a gear located at each of the wing ends and at each end of the leading edge flap, which, although rotatable, is held in place by a leading edge flap support rod that transverses the length of the reconfigurable airfoil.

A two gear arrangement (both on same axis) is positioned at the movable support means of each of the end support means units. The two gear assembly is kept in place by the main support means section control rod; and rotating the two gear assembly causes two co-ordinated rotations: (a) The rotation of the leading edge flap gear, by the chain link between the two different gear assemblies; and (b) The movable support means, which carries a curved gear rack which is fastened to the movable support means of each end pair, causes the movable support means to rotate the upper airfoil panel.

Thus, as the main section movable support means rotates, so does the leading edge flap, simultaneously raising both the support means of the leading-edge flap and the main airfoil section support means.

IV. THE INVENTION'S COMPONENTS AND CONCEPTS ARE SIMILAR TO THOSE AVAILABLE IN THE PRIOR ART, EXCEPT FOR THE PRESENT CONCEPTS IN PARTICULAR COMBINATION

In a hindsight consideration of the present invention to determine factors of its inventive and novel nature, it is also not only conceded but emphasized that the prior art had details usable in this invention if the prior art had had the guidance of the present invention's concepts.

That is, it is emphasized that the prior art had the following several particulars; however, and most significantly, the prior art has not had them in the advantageous and particular overall combination achieving the overall effect provided by this invention as a whole:

a. The prior art had airfoils having a lower panel and an upper panel, spaced apart;

b. The prior art knew that the shape of the airfoil had a significant role in the aerodynamic property of the wing;

c. The prior art used relative movement of components of an overall combination for various purposes, even relative sliding movement; d. The prior art had extension devices for various purposes;

e. The prior art knew that the aerodynamic properties of an airfoil were dependent on the shape of the outer surfaces of the wing's lower and upper surfaces;

f. The prior art knew of articles such as tongs, other hand tools, etc., which had parts hinged along one edge, and knew that the overall shape of the combination would change if the parts were relatively spread by open or closure movement away from the hinge axis;

g. The prior art had infinite means of effecting a change of relative position of two components by control and force-transmission from a control site remote from the site of the changed position of the components; and h. The prior art even had means to change aerodynamic effects of airfoil sections, by effective overall shape-change by relative movement of both outer panels, such as rotation of propellers about radial axes, and even by relative movement of the outer panels relative to one another, and movable edge flaps.

Thus, the prior art in this field is not only acknowledged, it is emphasized, for it helps to show by its very diversity that although the prior art has had all types of mechanisms, and has had knowledge of various operational concepts as to airfoil details for many years, and with worldwide knowledge by indefinite numbers of persons throughout those years, and in spite of the problems of airfoil considerations involving non-changeable shapes, none of the prior art has provided nor suggested the simplified and overall concepts which characterize the present invention, and by which this invention has been achieved; and more particularly, none of the prior art has suggested or achieved the particular concepts of changeable airfoil shape as provided by the present invention, with the advantageous construction and operation concepts and characteristics of the present invention.

Accordingly, the various concepts and components are conceded and emphasized to have been widely known in the prior art; nevertheless, the prior art not having had the present concepts in combination to achieve the overall invention as a whole, even only a fair amount of realistic humility, to avoid consideration of this invention improperly by hindsight, requires the concepts and achievements here of the combination shown herein to be realistically viewed as inventive in their nature. And especially is this a realistic consideration when viewed from the position of a person of ordinary skill in this art at the time of this invention, and without trying to reconstruct this invention from the prior art without use of hindsight toward particulars not suggested by the prior art of all relevant fields.

V. BRIEF DESCRIPTION OF THE DRAWINGS

The above description is of somewhat introductory and generalized form. More particular details, concepts, and features are set forth in the following and more detailed description of an illustrative embodiment, taken in conjunction with the accompanying drawings, which are of somewhat schematic and diagrammatic nature, for showing of the inventive concepts as are illustrated in this embodiment, the airfoil here illustrated as a section of an aircraft wing:

FIG. 1 is a schematic view of a section of an airfoil wing, with panel sections shown only fragmentally, illustrating particularly the set of stationary support means or ribs. the set of movable ribs, and the set of flap panel ribs, and also showing the drive means by which the aerodynamic properties of the wing are controlled; and in this view the movable ribs and the movable flap panel ribs are shown in a controlled setting in which the upper airfoil panel and the flap panel are at a lowermost position of control adjustment of overall wing-height;

FIG. 2 is a fragmental diagram of the sliding junction of the upper panel of the flap panel and the upper panel of the main body of the airfoil;

FIGS. 3–5 are diagramatic elevational views, sequentially, of typical sets of stationary support ribs, movable support ribs, and flap panel ribs, with rotation-control for changeability for airfoil characteristics also shown; and these FIGS. 3–5 also illustrate the changeability of aerodynamic shape by the respective but different locations $X_3$, $X_4$, and $X_5$, as being the uppermost point in the composite airfoil section, and also the changeability of such highest points with respect to the distance rearwardly of the leading edge of the airfoil section, achieved by the control of the movable ribs and flap panel ribs, as indicated by the respective dimensions $Y_3$, $Y_4$, and $Y_5$ in FIGS. 3–5, and these FIGS. 3–5 also illustrate the same airfoil changeability factor by the relative highest locations of airfoil portions, as is indicated by the dimension indicators $Z_3$, $Z_4$, and $Z_5$.

More particularly, as to these FIGS. 3–5:

FIG. 3 shows the above-stated components in a condition of control in which the airfoil height $Z_3$ is minimum, and the distance $Y_3$ from the leading edge of the composite airfoil section to the highest point of the airfoil section, $X_3$, are the lowest, of FIGS. 3–5;

FIG. 4 represents an intermediate condition of control as noted by the indicators $X_4$ and $Y_4$, and $Z_4$;

FIG. 5 is a view in which the airfoil indicators are shown as maximum as shown by the indicator symbols $X_5$, $Y_5$, and $Z_5$; and FIG. 6 is a bottom fragmental view, in enlarged scale, showing the rear portion of the wing at a location along the wing span at which there are a set of the stationary support ribs and the movable support ribs.

Depending on the rigidity of the panels there may be a slight change in their shape as well as their relative spacing or angle; but such slight change would not be apparent in views of this scale.

VI. DESCRIPTION OF ILLUSTRATIVE EMBODIMENT OF THE INVENTION

A wing 10 is shown having an upper panel means 12 and a lower panel means 14, operatively interconnected as detailed herein, those panels 12 and 14 being large sheets extending fully over the wing 10, and providing, respectively, the wing 10's upper and lower sheet-like skin or surfaces 12 and 14 respectively.

The panels 12 and 14 are spaced apart and shaped to have aerodynamic airfoil property when in forward motion (as noted by direction indicator 16) relative to the surrounding air; and per the inventive concepts, the wing 10 has novel means for changing the spacing of the panel means 12/14, thereby to change the wing 10's aerodynamic property.

As further provided, the wing 10 also carries a flap panel means 18, having a skin 19 as its upper surface, and an intermediate or frontal portion 20. The lower portion 21 of the frontal portion 20 bends smoothly rearwardly along its lower edge portion 21; and, as the flap panel 18 rotates (as detailed below), that lower flap panel portion 21 slides along the forward edge 21a of the lower sheet 14 of the main wing section, as schematically shown in FIGS. 3–5. All the panel portions 19, 20, and 21 are smoothly interconnected, here shown as being integral portions of the overall surface sheeting of flap panel 18.

The overall flap panel 18 extends from the lower panel means 14 to the upper panel means 12, and the flap panel means 18 is movably interconnected to the lower panel means 14, as herein described, and the location of the flap panel means 18 is along the forward edge 22 of the upper panel means 12 and the lower panel means 14; and the flap panel's upper sheet 19 is slidable with respect to the wing's upper panel means 12.

As supportive structure, the wing 10 has a set of stationary rib means 23, transversely spaced and extending fore-and-aft, to which the lower panel means 14 are connected, as noted herein. And as part of the movable support structure details, there is provided a set of movable rib means 24 to which the upper panel means 12 are connected. Those movable rib means 24 also extend fore-and-aft of the wing, with one of each of the ribs 23/24 shown adjacent one of the other type of ribs. The lower panel means 14 has slots 24a (FIG. 6) for accommodating the rear end 24b of the movable ribs 24, for each rear rib-end 24b.

The movable ribs 24 do not extend as far forwardly as the stationary ribs 23; and, as shown, in the same respective planes as each of the movable ribs 24, but forwardly thereof, there is provided a rib 25 of the flap panel means 18. Those ribs 25 support the panel sheeting 19/20/21, and are active in the movability factors of the aerodynamic property changeability as now detailed herein.

Now referring to the aerodynamic property changeability, there is provided a first rotatable shaft means 26, shown as fixedly located with respect to the lower panel means 14 and stationary rib means 23, but rotatable with respect thereto; and schematically shown as powered and controlled by the aircraft are shown means 28 for rotating the rotatable shaft means 26. The fixed location of shaft 26 is shown by it being supportingly held by bearings 29 in the stationary support ribs 23.

Drive means 30, as detailed below, are operatively carried by the first rotatable shaft means 26; and a rack means 32 is carried by the movable rib means 24, rack 32 being drivable by the drive means 30 to move the upper panel means 12 with respect to the lower panel means 14, for achieving the said shape-changing of the wing 10 in correspondence to the rotation of the said shaft means 26 and its control 28 by the aircraft.

Accepting rotary drive from the first shaft 26 is a second rotatable shaft means 34, that second one of the rotatable shaft means 34 being rotatably carried by aligned bearings 35 on the stationary ribs 23, adjacent their front ends; and for rotatably driving the flap panel means 18 (and their ribs 25), the second rotatable shaft means 34 carries a driven pulley means 36 on the second rotatable shaft 34.

The driven pulley 36 is affixed to the flap panel rib 25, and that pulley 36 itself is affixed to the shaft 34; and thus when the belt or chain 37 is moved by the first shaft 26, the co-ordination of movement of flap panel 18 and the main upper panel sheet 12 is achieved, as now summarized.

That is, rotation of the first shaft 26 rotates pulley 30 which, by engagement of rack 32 affixed to movable rib 24, rotates the movable ribs 24 to cause the upper main sheet 12 to rotate. Also, at that time, the rotation of shaft 26 acts through belt 37 and driven pulley 36 to rotate flap panel rib 25 and flap panel skin 19.

The first shaft means 26, i.e., the shaft 26 which is carried by the bearings 29 of the stationary support ribs 23 about one-half way of the fore-and-aft length of those stationary ribs 23, also carries a driving pulley means 38; and the drive belt or chain 37 operatively interconnects the driving pulley means 38 and the driven pulley means 36.

The relative position of both the flap panel means 18 and upper panel means 12 is co-ordinated therefore by the co-operation of the drive means 30 and rack means 32, and by the co-operation of the driving pulley means 38 and the driven pulley means 36.

Accommodating the rotational movability of the movable main ribs 24 even though the first shaft 26 passes through stationary ribs 23 as well as the movable ribs 23, those movable ribs 24 are provided with curved slots 40, those slots and the gear rack 32 both having a large radius of curvature about the rear pivotal connection 42 provided by bearings 44 of all ribs 23 and 24 through which a shaft 46 passes.

At that pivot location 42, the slight amount of movement of the rear end 24b of movable ribs 24 through the plane of the lower panel 14 is accommodated by a slot 24a (FIG. 6).

Summarizing, as first shaft 26 is rotated by control source schematically shown at 28, both gears 30 and 38 keyed to shaft 26 rotate, gear 30 (arrow 50) driving the rack 32 and thus also the movable rib 24 (arrow 52).

Also, that upward movement of upper panel 12, and the rotation of shaft 34 (by chain 37) causing its keyed gears 36 to rotate and thus rotate flap means 18 to which the gears 36 are fixed, cause the flap means 18 to correspondingly rotate (arrow 54), sliding as indicated by FIG. 2 (as may be helped by a small slider lug 56), all as indicated schematically by the sequential showings of FIGS. 3-5; and thus the overall airfoil shape changes, from the basic position of panels 12 and 19/20/21, as schematically shown in full lines in FIGS. 1 and 2, and in dashed lines 58 (FIGS. 4,5) for comparison purposes to the full-line showings of those components in FIGS. 4 and 5, and by the above-mentioned indications noted as to the reference letters "X", "Y", and "Z" in FIGS. 3-5.

VII. CONCLUSION

It is thus seen that an airfoil constructed and used according to the inventive concepts herein set forth, provides novel concepts of a desirable and advantageous airfoil of changeable shape, and particularly as to the control factors for achieving the change of shape by an integrated control for co-ordinated movement of both the flap panel and of the upper sheet or panel of the main wing section, the various concepts yielding the advantages of achievement of change of aerodynamic properties of the wing according to the conditions as predicted and/or encountered, and is conceptually different from the prior art even though wings and airfoils with special needs or characteristics have been known for years; yet significantly this particular and overall combination has not been suggested by the prior art, this achievement in the overall combination being a substantial and advantageous departure from prior art, even though the prior art has known and used the various components for many years but not in this combination to provide changeable airfoil shape. Thus particularly is the overall difference from the prior art of components or other airfoils significant when the nonobviousness is viewed by a consideration of the overall subject matter as a whole, as integrally incorporating the contributory features but different in overall result from the prior art, in contrast to merely those details of novelty themselves, and further in view of the prior art teaching away from the particular and inter-related concepts and features of the present invention.

In summary as to the nature of these advantageous concepts, their inventiveness is shown by novel features of concept and construction shown here, in novel and advantageous combination, not only being different from all the prior art known, but because the achievement is not what is or has been suggested to those of ordinary skill in the art, especially realistically considering this as comprising components which individually are similar in nature to what is well known to many persons, and in a usefulness which could have been a full motivation to most persons who have mechanical skill, thus as possible creators of this combination surely most of the highly skilled personnel of the competitive airplane manufacturing industry for many years, the entire world over. No prior art has suggested the modifications of any prior art to achieve the novel concepts here achieved, with the various features providing the novelty of airfoil shape changing as herein explained, characterized by its novel and advantageous concepts.

Accordingly, it will thus be seen from the foregoing description of the invention according to this illustrative embodiment, considered with the accompanying drawings, that the present invention provides new and useful concepts of a novel and advantageous airfoil having and yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown. For example, phrases such as "belt" or "pulley" or "chain", or "drive" as to a drive means force transmission operativity, and words such as "gear", are intended in the broad sense of components having force and movement effects; and thus all such expressions are to be taken in a broad sense without the redundancy of repeated mentions of alternatives.

Moreover, to avoid redundancy, especially as to uses of these airfoil control concepts in airfoils other than aircraft wings, it is to be realized that words such as "upper," "lower," and "front" are used descriptively in the broad sense as if the airfoil were a horizontal wing specifically as applicable to the embodiment herein illustrated as an aircraft wing, but without limitation to airfoils used in a generally horizontal plane.

I claim:

1. An airfoil having an upper panel means and a lower panel means, operatively interconnected, and which are spaced apart and shaped to have aerodynamic airfoil property when in forward motion relative to the surrounding air, the airfoil having means for changing the spacing of the panel means, thereby to change the aerodynamic property, and the airfoil also carries a flap panel means which extends from the lower panel means to the upper panel means, the flap panel means being movably interconnected tothe lower panel means and is slidable with respect to the upper panel means;

the flap panel means being positioned along the forward edge of the upper panel means and the lower panel means;

a set of stationary support means to which the lower panel means are connected;

a set of movable support means to which the upper panel means are connected;

a first rotatable shaft means;

the said first rotatable shaft means being fixedly located with respect to the lower panel means and stationary support means, but rotatable with respect thereto;

means for rotating the first rotatable shaft means;

drive means which are operatively carried by the first rotatable shaft means; and driven means carried by the movable support means, and drivable by the drive means to move the upper panel means with respect to the lower panel means for achieving the same shape-changing of the airfoil in correspondence to the rotation of the said first rotatable shaft means;

in a combination which includes a second rotable shaft means whose axis is fixedly located with respect to the lower panel means and the stationary support means, but is rotatable thereto, and non-rotatable with respect to the flap panel means;

and one of the said second rotatable shaft means and the flap panel means carries a driven means;

and a drive transmission means operatively interconnecting the driving means and the driven means which is carried by one of the second rotatable shaft means and flap panel means, for co-ordinating movement of the upper panel means and the flap panel means.

2. The invention as set forth in claim 1, in which the combination includes a driving pulley means carried by the first rotatable shaft means, the second rotatable shaft means being rotatably carried on the stationary support means; and the said second rotatable shaft means carries a driven pulley means; and a drive belt operatively interconnects the driving pulley means and the driven pulley means; and the relative position of both the flap panel means and the upper panel means being co-ordinated by the co-operation of the drive means and driven means, and of the driving pulley means and the driven pulley means.

3. The invention as set forth in claim 1 in which the rotatable shaft means passes through the movable support means, but the movable support means are provided with openings substantially larger than the size of the rotatable shaft means, thus permitting the movable support means to move in response to rotation of the rotatable shaft means even though the rotation of the rotatable shaft means is on a fixed axis as aforesaid and the movable support means move in a translatory manner with respect to the axis of the rotatable shaft means.

4. The invention as set forth in claim 1 in which the driven means comprises a rack gear drivable by the drive means.

5. The invention as set forth in claim 2, in which the first rotatable shaft means passes through the movable support means, but the movable support means are provided with openings substantially larger than the size of the first rotatable shaft means, thus permitting the movable support means to move in response to rotation of the first rotatable shaft means even though the rotation of the first rotatable shaft means is on a fixed axis as aforesaid, and the movable support means move in a translatory manner with respect to the axis of the first rotatable shaft means.

6. The invention as set forth in claim 1 including means by which the relative position of both the flap panel means and upper panel means is co-ordinated by the co-operation of the drive means and driven means, and of the driving pulley means and the driven pulley means.

7. The invention as set forth in claim 2, in which the driven means comprises a rack gear drivable by the drive means.

8. The invention as set forth in claim 3, in which the driven means comprises a rack gear drivable by the drive means.

* * * * *